US00RE38941E

(19) United States
(12) Reissued Patent
Ishikawa

(10) Patent Number: US RE38,941 E
(45) Date of Reissued Patent: Jan. 24, 2006

(54) INK DROPLET EJECTING METHOD AND APPARATUS

(75) Inventor: Hiroyuki Ishikawa, Nisshin (JP)

(73) Assignee: Brother Kogyo Kabushiki Kaisha, Nagoya (JP)

(21) Appl. No.: 10/788,047

(22) Filed: Feb. 26, 2004

Related U.S. Patent Documents

Reissue of:
(64) Patent No.: 6,350,003
Issued: Feb. 26, 2002
Appl. No.: 09/201,129
Filed: Nov. 30, 1998

(30) Foreign Application Priority Data

Dec. 16, 1997 (JP) ..... 9-346722

(51) Int. Cl.
*B41J 29/38* (2006.01)

(52) U.S. Cl. ..... 347/11; 347/9; 347/10; 347/11

(58) Field of Classification Search ..... 347/9, 347/10, 11
See application file for complete search history.

(56) References Cited

U.S. PATENT DOCUMENTS

| | | | |
|---|---|---|---|
| 4,523,200 | A | 6/1985 | Howkins |
| 5,028,936 | A | 7/1991 | Bartky et al. |
| 5,359,350 | A | 10/1994 | Nakano et al. |
| 5,495,270 | A | 2/1996 | Burr et al. |
| 5,736,994 | A | 4/1998 | Takahashi |
| 5,903,286 | A | 5/1999 | Takahashi |
| 6,095,630 | A | 8/2000 | Horii et al. |
| 6,099,103 | A | 8/2000 | Takahashi |

FOREIGN PATENT DOCUMENTS

| | | |
|---|---|---|
| JP | 59-133066 | 7/1984 |
| JP | 63-71355 | 3/1988 |
| JP | 63-094850 | 4/1988 |
| JP | 63-247051 | 10/1988 |
| JP | A-63-247051 | * 10/1988 |
| JP | 01-101160 | 4/1989 |
| JP | 01-113252 | 5/1989 |
| JP | 04-189144 | 7/1992 |
| JP | 06-55513 | 7/1994 |
| JP | 07-195713 | 8/1995 |
| JP | A-9-29960 | 2/1997 |
| JP | A-9-29961 | 2/1997 |
| JP | A-9-29964 | 2/1997 |
| JP | 09-201962 | 8/1997 |
| JP | 10-157100 | 6/1998 |

OTHER PUBLICATIONS

U.S. Appl. No. 10/665,805.

* cited by examiner

*Primary Examiner*—Stephen D. Meler
*Assistant Examiner*—Julian D. Huffman
(74) *Attorney, Agent, or Firm*—Oliff & Berridge, PLC

(57) ABSTRACT

In an ink droplet ejecting method and apparatus, by merely adding one pulse after a driving waveform for a main ejection of ink, without changing the driving voltage, it is possible to obtain an ink droplet of a desired volume and also possible to minimize the decrease of the ink droplet speed. The pulse width Wa of a jet pulse signal A is set equal to time T required for one-way propagation through an ink chamber of a pressure wave which is generated in the ink chamber, while the pulse width Wb of an additional pulse signal B is set at 0.2T to 0.6T, and a time difference between a fall timing of the jet pulse signal A and a rise timing of the additional pulse signal B is set at 0.3T to 0.7T, whereby an ink droplet being ejected is reduced in size and only one drive voltage is sufficient. Thus, the cost can be reduced, and a decrease of the ink droplet speed is prevented.

41 Claims, 9 Drawing Sheets

360dpi

720dpi

1440dpi

INK DROPLET EJECTING METHOD AND APPARATUS

Matter enclosed in heavy brackets [ ] appears in the original patent but forms no part of this reissue specification; matter printed in italics indicates the additions made by reissue.

BACKGROUND OF THE INVENTION

1. Field of the Invention

The invention relates to an ink droplet ejecting method and apparatus of an ink jet type.

2. Description of Related Art

According to a known ink jet printer of an ink jet type, the volume of an ink flow path is changed by deformation of a piezoelectric ceramic material. When the ink flow path volume decreases, the ink present in the ink flow path is ejected as a droplet from a nozzle. However, when the ink flow path volume increases, the ink is introduced into the ink flow path from an ink inlet. In this type of printing head, multiple ink chambers are formed by partition walls of a piezoelectric ceramic material. An ink supply device, such as ink categories, are connected to one end of each of the multiple ink chambers. The opposite end of each of the ink chambers is provided with an ink ejecting nozzle (hereinafter referred to simply as "nozzles"). The partition walls are deformed in accordance with printing data to make the ink chambers smaller in volume, whereby ink droplets are ejected onto a printing medium from the nozzles to print, for example, a character of a figure.

An example of this type of ink jet printer is a drop-on-demand type ink jet printer that ejects ink droplets, which is popular because of a high ejection efficiency and a low running cost. An example of a drop-on-demand type ink jet printer is a shear mode type that uses a piezoelectric material, which is disclosed in Japanese Published Unexamined Patent Application No. Sho 63-247051.

As shown in FIGS. 7(a) and 7(b), this type of ink droplet ejecting apparatus 600 includes a bottom wall 601, a top wall 602 and shear mode actuator walls 603 (shown in FIG. 8 as 603a–g) located therebetween. The actuator walls 603 each include a lower wall 607 bonded to the bottom wall 601 and polarized in the direction of arrow 611, and an upper wall 605 formed of a piezoelectric material, the upper wall 605 being bonded to the top wall 602 and polarized in the direction of arrow 609. Adjacent actuator walls 603, as a pair, define ink chamber 613 (shown in FIG. 8 as 613a–d) therebetween. The actuator walls 603 that are adjacent to the ink chamber, in a pair, define a space 615 which is narrower than the ink chamber 613.

A nozzle plate 617 having nozzles 618 (shown in FIG. 8 as 618a–d) is fixed to one end of each of the ink chambers 613, while the opposite end of each of the ink chambers is connected to an ink supply source (not shown). Electrodes 619 (shown in FIG. 8 as 619a–d) and 621 are respectively formed on both side faces of each actuator wall 603, as metallized layers. More specifically, electrode 619 is formed on the actuator wall 602 on the side of the ink chamber 613, while electrode 621 is formed on the actuator wall 603 on the side of the space 615. The surface of electrode 619 is covered with an insulating layer 630 for insulation from ink. Electrode 621, which faces the space 615, is connected to a ground 623, and electrode 619, which is provided in each ink chamber 613, is connected to a controller 625, which provides an actuator drive signal to the electrode.

The one-way propagation time T is a time required for the pressure wave in the ink chamber 613 to propagate longitudinally through the same chamber. Given that the length of the ink chamber 613 is L and the velocity of sound in the ink present in the ink chamber 613 is a, the time T is determined to be T=L/a.

According to the theory of pressure wave propagation, upon lapse of time T, or an odd-multiple time thereof, after the above application of voltage, the internal pressure of the ink chamber 613 reverses into a positive pressure. In conformity with this timing, the voltage being applied to the electrode in the ink chamber 613c is returned to 0(V). As a result, the actuator walls 603e and 603f revert to their original state (FIGS. 7(a) and 7(b) before the deformation, whereby a pressure is applied to the ink. At this time, the above positive pressure, and the pressure developed by the reverting of the actuator walls 603e and 603f to their original state before the deformation, are added together to provide a relatively high pressure in the vicinity of the nozzle 618c in the ink chamber 613c, whereby an ink droplet is ejected from the nozzle 618c. An ink supply passage 626, shown in FIG. 7(b), that communicates with each of the ink chambers 613, is formed by members 627 and 628.

Conventionally, in this type of ink droplet ejecting apparatus 600, when an ink droplet of a small volume is to be ejected for enhancing the printing resolution, a control has been provided to decrease the driving voltage in multiple steps, for example. However, such a method of controlling the voltage in multiple steps leads to an increase in cost of a driver IC, etc., and attempting to reduce the volume of an ink droplet gives rise to the problem that even the speed of the ink droplet decreases. In order to obtain an ink droplet of a small volume without decreasing the ink droplet speed, it has been proposed to use in additional pulse of a low voltage level, after application of a jet pulse and before completion of ink ejection. However, this proposal also leads to an increase in cost of a driver IC, etc. because multiple voltages are needed as driving pulses.

SUMMARY OF THE INVENTION

The invention solves the above-mentioned problems, and it is an object of the invention to provide an ink droplet ejecting method and apparatus, wherein, after a driving waveform for a primary ejection of ink, only one additional pulse is added, thereby making it possible to obtain an ink droplet of a desired volume and also possible to minimize the decrease of the ink droplet speed.

In order to achieve this object, an ink droplet ejecting method is provided, wherein a jet pulse signal is applied to an actuator, for changing the volume of an ink chamber filed with ink, to generate a pressure wave within the ink chamber, thereby applying pressure to the ink and allowing a droplet of the ink to be ejected from a nozzle. Both the jet pulse signal and an additional pulse signal are applied to the actuator in accordance with a one-dot printing instruction. The jet pulse signal has a pulse width which allows the volume of the ink chamber to increase upon application of a voltage of the actuator, thereby causing a pressure wave to be generated within the ink chamber, and which, after the lapse of time T required for an approximately one-way propagation of the pressure wave through the ink chamber or after the lapse of an odd-multiple time of the time T, allows the volume of the ink chamber to decrease from the increased state to a normal state. The additional pulse signal has a pulse width of approximately 0.2T to 0.6T relative to the jet pulse signal, and a time difference between a fall timing of the jet pulse signal and a rise timing of the additional pulse signal is 0.3T to 0.7T.

According to the above method, the ink present in the ink chamber is about to rush out from the nozzle at the leading edge and the trailing edge of the jet pulse signal, and with the additional pulse signal which is subsequently applied halfway at the above timing, a part of the ink droplet which is rushing out from the nozzle is pulled back. Consequently, it is possible to reduce the size of the flying ink droplet after ejection, and hence possible to attain a high printing resolution easily. Further, since it is not necessary to change the driving voltage to reducing the size of the ink droplet, the cost is reduced and the ink droplet speed is only minimally decreased.

In accordance with another aspect of the ink droplet ejecting method, the jet pulse signal and the additional pulse signal have the same peak value. According to this method, a single drive voltage source is sufficient to obtain a small-sized ink droplet, and therefore the cost can be reduced.

An ink droplet ejecting apparatus is also provided that includes an ink chamber filled with ink, an actuator for changing the volume of the ink chamber, a driving power source for applying an electric signal to the actuator, and a controller which provides controls so that, in accordance with a one-dot printing instruction, a jet pulse signal and an additional pulse signal are applied to the actuator from the driving power source, thereby causing the ink present in the ink chamber to be ejected. The controller provides control so that the jet pulse signal has a pulse width which allows the volume of the ink chamber to increase upon application of a voltage to the actuator, thereby causing a pressure wave to be generated within the ink chamber, and which, after the lapse of time T required for an approximately one-way propagation of the pressure wave through the ink chamber or after the laps of an odd-multiple time of the time T, allows the volume of the ink chamber to decrease from the increased state to a normal state. The controller also provides control so that the additional pulse signal has a pulse width of approximately 0.2T to 0.6T relative to the jet pulse signal, and a time difference between a fall timing of the jet pulse signal and a rise timing of the additional pulse signal is 0.3T to 0.7T.

This structure provides the same advantages as the corresponding method in accordance with the invention discussed above.

In accordance with another aspect of this ink droplet ejecting apparatus, the jet pulse signal and the additional pulse signal have the same peak value. This structure provides the same advantages as the corresponding aspect of the method in accordance with the invention discussed above.

An ink droplet ejecting apparatus is also provided that includes an ink chamber filled with ink, an actuator for changing the volume of the ink chamber, a driving power source for applying an electric signal to the actuator, and a controller which provides control so that in accordance with a one-dot printing instruction, a jet pulse signal for ejecting the ink present in the ink chamber and an additional pulse signal for withdrawing a part of an ink droplet which has rushed out from a nozzle in accordance with the jet pulse signal, are applied from the driving power source to the actuator. The controller determines whether or not the additional pulse signal is to be used. According to the apparatus, the volume of ink droplet can be adjusted by either applying, or not applying, the additional pulse signal in accordance with a preset resolution.

An ink droplet ejecting apparatus is also provided that includes an ink chamber filled with ink, an actuator for changing the volume of the ink chamber, a driving power source for applying an electric signal to the actuator, and a controller which provides control so that, in accordance with a one-dot printing instruction, a jet pulse signal for ejecting the ink present in the ink chamber and an additional pulse signal for withdrawing a part of an ink droplet which has rushed out from a nozzle in accordance with the jet pulse signal, are applied to the actuator from the driving power source. The controller provides controls so that a time difference from the application of the jet pulse signal up to the application of the additional pulse signal, and the pulse width of the additional pulse signal, can be adjusted. According to this apparatus, since a control is provided so that the time difference from the application of the jet pulse signal up to the application of the additional pulse signal can be adjusted in accordance with a preset resolution, it is possible to adjust the volume of an ink droplet.

In accordance with another aspect of this ink droplet ejecting apparatus, the jet pulse signal has a pulse width which allows the volume of the ink chamber to increase upon application of a voltage to the actuator thereby causing a pressure wave to be generated within the ink chamber, and which, after the lapse of time T required for an approximately one-way propagation of the pressure wave through the ink chamber or after the lapse of an odd-multiple time of the time T, allows the volume of the ink chamber to decrease from the increased state to a normal state. The pulse width of the additional pulse signal is controlled so as to be adjustable in the range of approximately 0.2T to 0.6T relative to the jet pulse signal, and the time difference is controlled so as to be adjustable in the range of approximately 0.3T to 0.7T from a trailing edge of the jet pulse signal up to a leading edge of the additional pulse signal. According to this apparatus, the decrease of the ink catalyst speed is minimized, so that the same advantages can be attained as the ink droplet ejecting apparatus discussed above.

According to the invention, as set forth above, by adding a predetermined additional pulse signal to a jet pulse signal for a one-dot printing instruction, a small volume ink droplet can be provided at high speed, without decreasing the ink droplet speed. Further, since the volume of an ink droplet can be adjusted as desired, it is possible to obtain a desired printing resolution easily.

Further, unlike the conventional art, multiple driving voltages are not required to reduce the size of an ink droplet. One driving voltage source is sufficient, and it is not necessary to change the driving voltage, thus reducing the cost.

BRIEF DESCRIPTION OF THE DRAWINGS

A preferred embodiment of the invention will be described in detail with reference to the following figures wherein.

DETAILED DESCRIPTION OF THE PREFERRED EMBODIMENT

An embodiment of the invention will be described hereinunder with reference to the drawings. The structure of a mechanical portion of an ink droplet ejecting apparatus of this embodiment is the same as that shown in FIGS. 7(a) and 7(b), referred to above, and therefore an explanation thereof is omitted.

An example of specific dimensions of this ink droplet ejecting apparatus, indicated as 600, will now be described. The length L of an ink chamber 613 is 9 mm. As to the dimensions of a nozzle 618, its diameter on an ink droplet ejection side is 40 μm, its diameter on the ink chamber 613 side is 72 μm, and its length is 100 μm. In an experiment, the viscosity of 25° C. of ink used was about 2 mPas and the surface tension thereof was 30 mN/m. The ratio of the above length L to a sonic velocity, a, in the ink present within the ink chamber 613, i.e., L/a (=T) was 10 μsec.

Figure 1:
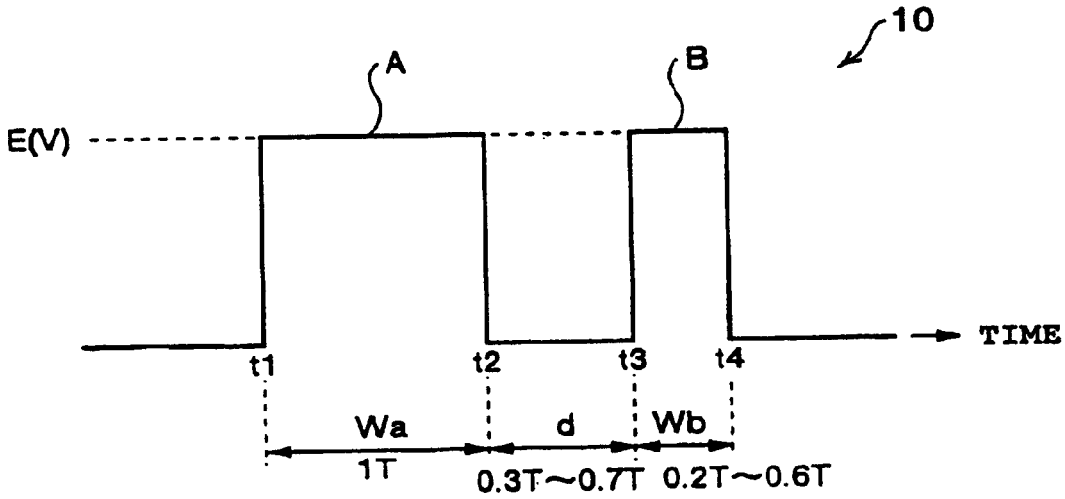
FIG. 1 is a diagram showing a driving waveform used in an ink droplet ejecting apparatus according to an embodiment of the invention.

FIG. 1 shows a driving waveform to be applied to an electrode 619 disposed in the ink chamber 613 in the embodiment of the invention. This driving waveform, indicated at 10, is a pulse signal including a jet pulse signal A for the ejection of an ink droplet, and an additional pulse signal B subsequent to the jet pulse signal A. The additional pulse signal B, which reduces the sizes of a flying ink droplet, has a pulse width smaller than that of the jet pulse signal A, and is applied at a timing at which a part of the ink droplet rushed out from the nozzle in accordance with the jet pulse signal A can be withdrawn. The jet pulse signal A and the additional pulse signal B have the same peak value (voltage value) of E(V), for example 20(V).

The wave width Wa of the jet pulse signal A is set equal to the ratio, L/a (=T), of the foregoing length L to a sonic velocity, a, in the ink present in the ink chamber 613, or corresponds to an odd-multiple time thereof (a value peculiar to a head), for example, 10 μsec, that a time difference, d, between a fall timing of the jet pulse signal A and a rise timing of the additional pulse signal B is 0.3T to 0.7T, that is, approximately 3 to 7 μsec, and that the wave width Wb of the additional pulse signal B is 0.2T to 0.6T, that is, approximately 2 to 6 μsec. The total time of the time difference, d, and the wave width, Wb, is approximately 5 to 13 μsec. At the wave width Wb, the additional pulse signal B does not cause ejection of an ink droplet. The pulse cycle in the case of printing the next dot in a continuous manner is 100 μsec, assuming that the driving frequency is 10 kHz.

Figure 2:
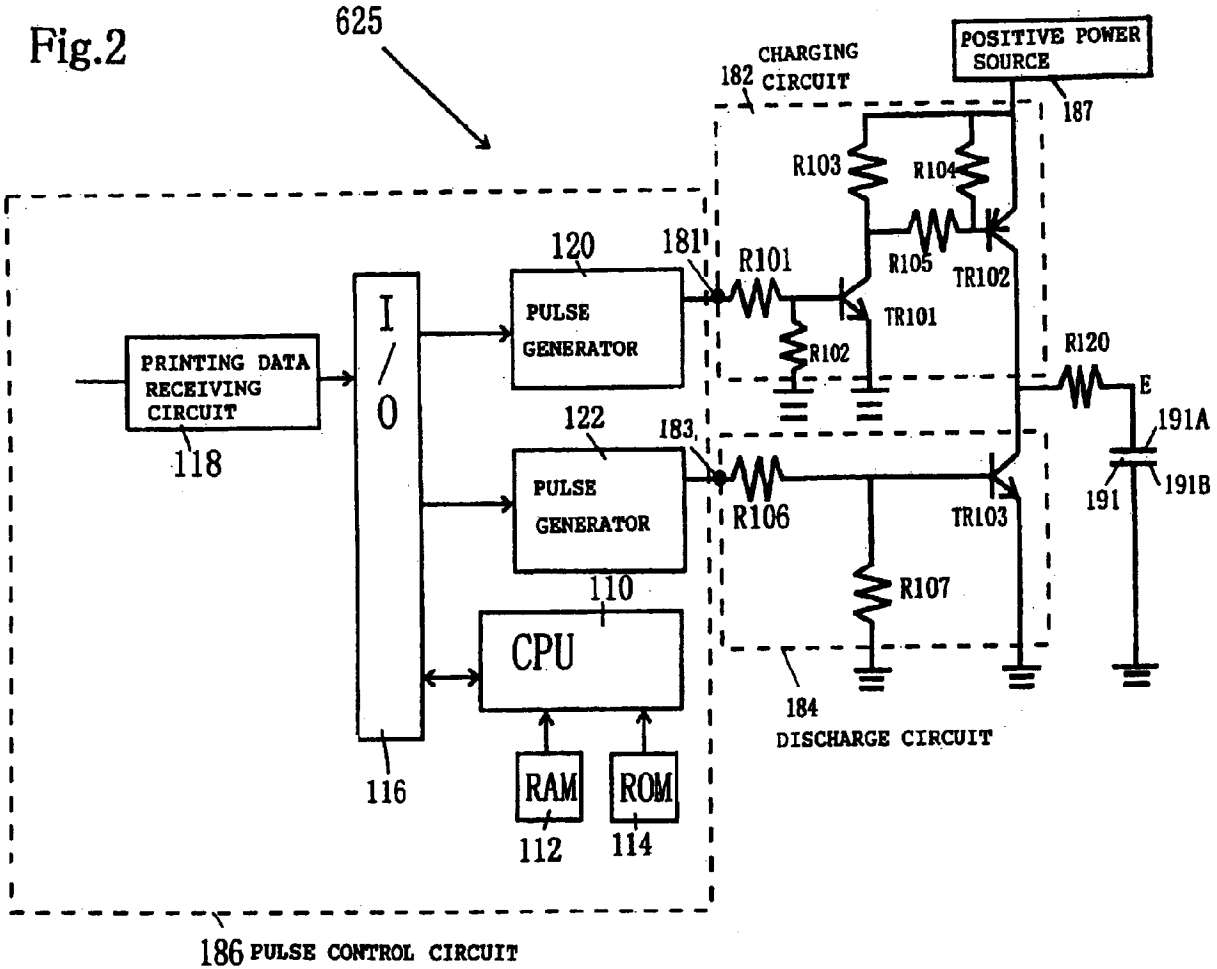
FIG. 2 is a diagram showing a drive circuit used in the ink droplet ejecting apparatus.
Figure 3:
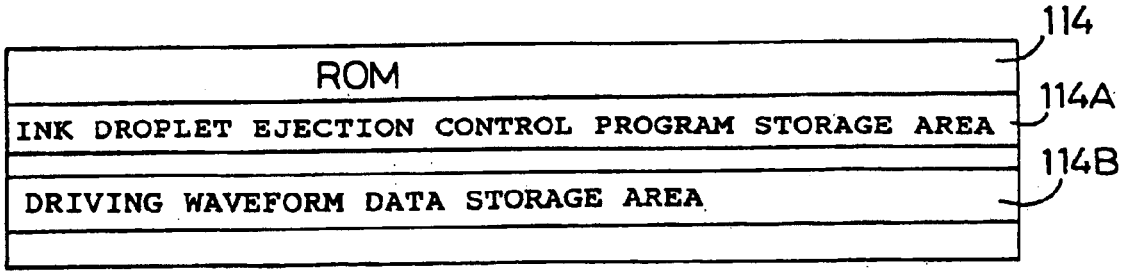
FIG. 3 is a diagram showing storage areas of a ROM used in the ink droplet ejecting apparatus.

Next, an example of a controller for implementing the driving waveform 10 will be described with reference to FIGS. 2 and 3. A controller 625 shown in FIG. 2 includes a charging circuit 182, a discharge circuit 184 and a pulse control circuit 186. A piezoelectric material of an actuator wall 603 and electrodes 619, 621 are represented equivalently by a capacitor 191. Numerals 191A and 191B denote terminals thereof.

Input terminals 181 and 183 are for inputting pulse signals to adjust the voltage to be applied to the electrode 619 in each ink chamber 613, to E(V) or 0(V). The charging circuit 182 includes resistors R101, R102, R103, R104, R105 and transistors TR101, TR102.

When an ON signal (+5V) is applied to the input terminal 181, the transistor TR101 conducts through resistor 101, so that an electric current flows from a positive power source 187, passes through resistor R103, and flows from the collector to the emitter of transistor TR101. Consequently, a divided voltage of the voltages applied to the resistor R104 and R105, which are connected to the positive power source 187, increases and so does the electric current flowing in the base of the transistor TR102, providing conduction between the emitter and the collector of the transistor TR102. A voltage of 20(V) from the positive power source 187 is applied to the terminal 191A of the capacitor 191 via the collector and emitter of the transistor TR102 and resistor R120.

Figure 7A:
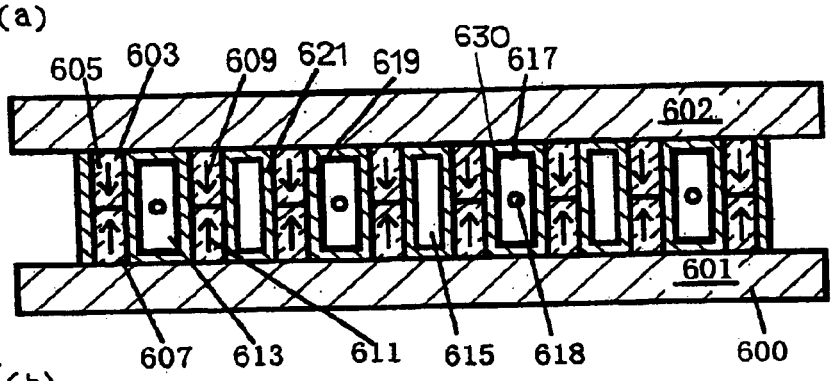
FIG. 7(a) is a longitudinal sectional view of an ink jet portion of a printing head.
Figure 7B:
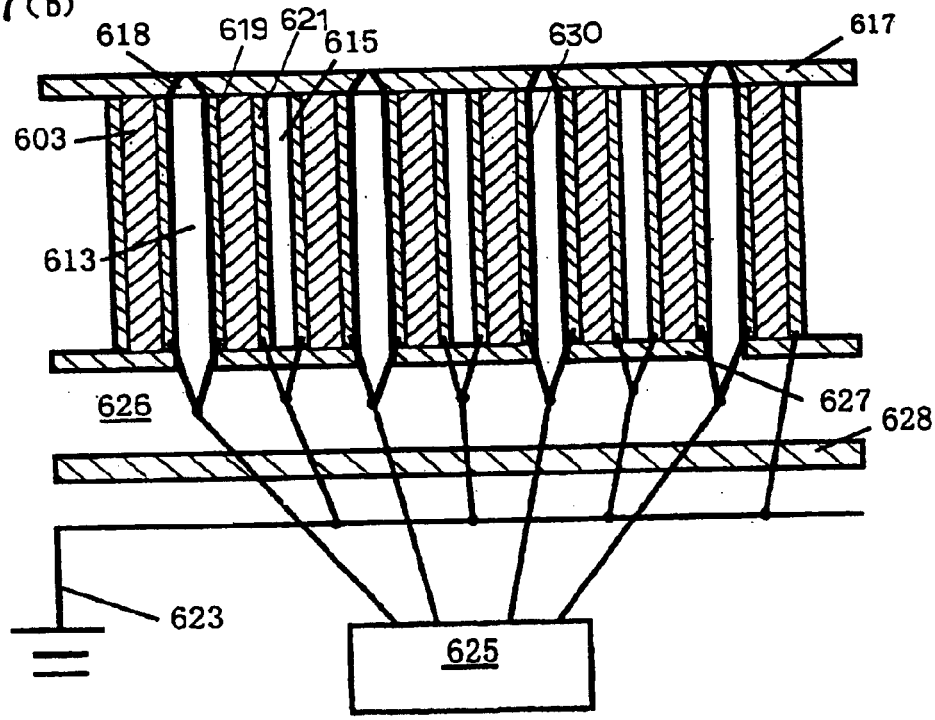
FIG. 7(b) is a transverse sectional view thereof.
Figure 8:
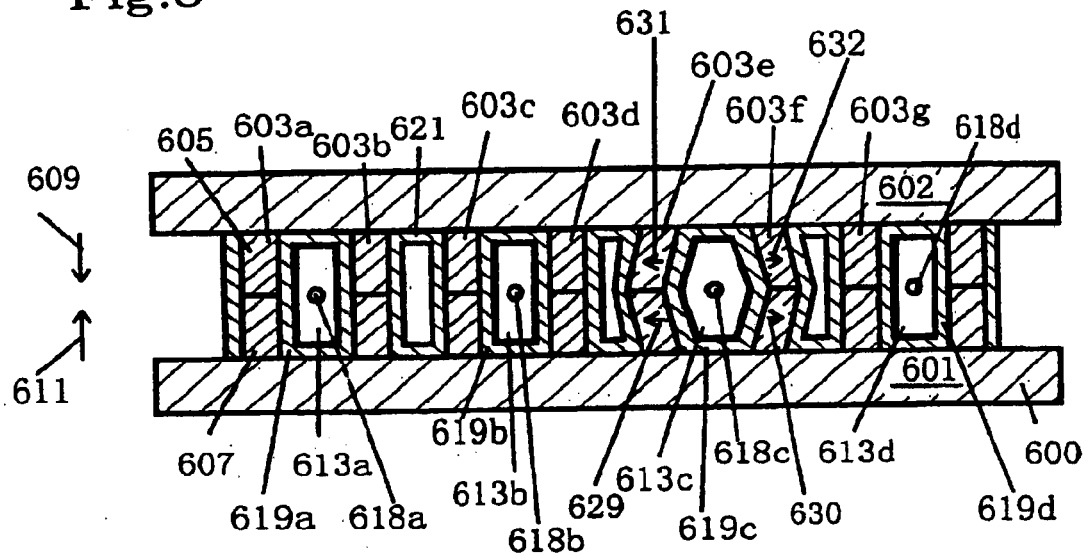
FIG. 8 is a longitudinal sectional view showing how the ink jet portion of the printing head operates.

The following description is now provided regarding the discharge circuit 184. The discharge circuit 184 includes resistors R106, R107 and a transistor TR103. When an ON signal (+5V) is applied to the input terminal 183, the transistor TR103 turns conductive via resistor R106 and the terminal 191A on the resistor R120 side of the capacitor 191 is grounded via resonator R120, so that the electric charge imposed on the actuator wall 603 of the ink chamber 613 shown in FIGS. 7(a), 7(b) and 8 is discharged.

Reference will now be made to the pulse control circuit 186 which generates pulse signals to be received by the input terminal 181 of the charging circuit 182 and the input terminal 183 of the discharge circuit 184. A CPU 110 is provided in the pulse control circuit 186 which performs various arithmetic operations. To the CPU 110 are connected, a RAM 112 for the storage of printing data and various other data, and a ROM 114 which stores sequence data for generating ON-OF signals in accordance with control program and timing in the pulse control circuit 186. In the ROM 114, as shown in FIG. 3, an area 114A for the storage of an ink droplet ejection control program, and an area 114B for the storage of driving waveform are provided. Thus sequence data of the driving waveform 10 is stored in the driving waveform data storage area 114B.

Figure 10:
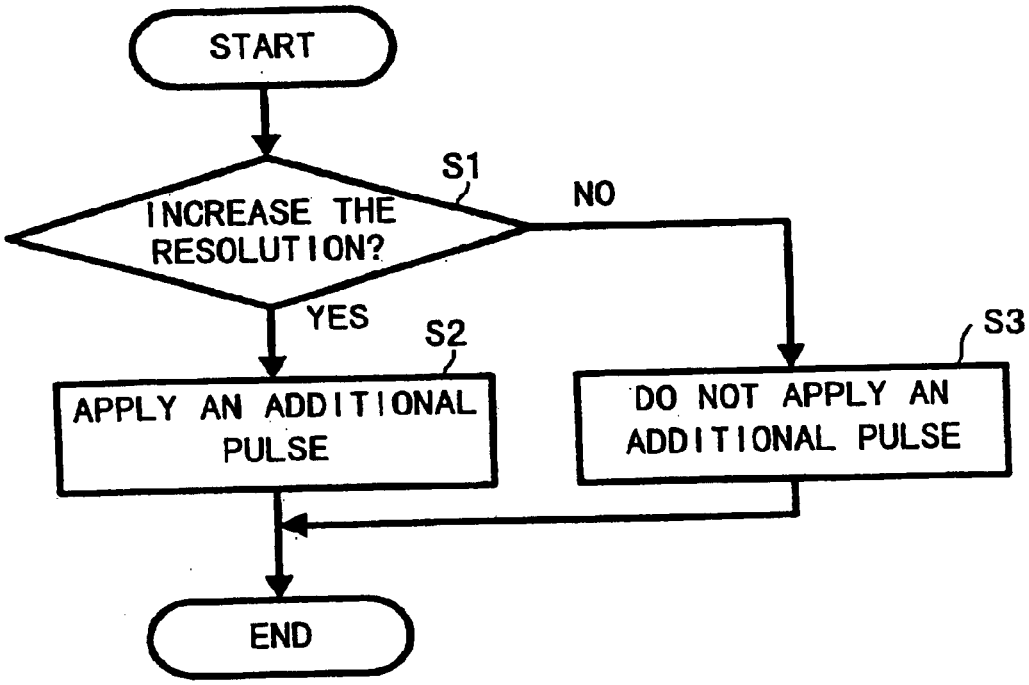
FIG. 10 is a flowchart explaining control contents of the ROM in the controller of the ink droplet ejecting apparatus according to the invention.

In the control program storage area 114A, as shown in FIG. 10, there is stored a program according to which the CPU 110 judges whether a setting made by a user is for enhancing the resolution (that is, reducing the volume of a one-dot ink droplet ejected) (S1), and on the basis of the result of the this judgment, it is determined whether the additional pulse B is to be added to the jet pulse signal stored in the waveform data storage area 114B (S2, S3). A program is also stored in the control program storage area 114A for controlling the time difference, d, and the wave width, Wb, in an adjustable manner.

The CPU 110 is further connected to an I/O bus 116 for transmission and reception of various data. A printing data receiving circuit 118 and pulse generations 120 and 122 are also connected to the I/O bus 116. The output of the pulse generator 120 is connected to the input terminal 181 of the charging circuit 182, while the output of the pulse generator 122 is connected to the input terminal 183 of the discharge circuit 184.

The CPU 110 controls the pulse generators 120 and 122 in accordance with the sequence data stored in the driving waveform data storage area 114B of the ROM 114. Therefore, by having various patterns of the foregoing timing stored beforehand in the driving waveform data storing area 114B of the ROM 114, it is possible to apply a driving pulse of the driving waveform 10 shown in FIG. 1 to the actuator wall 603.

The same number of pulse generators 120, 122, charging circuit 182 and discharge circuit 184 are provided as the number of nozzles used. Although the above description is directed to controlling one nozzle, the same control can also be applied to the other nozzles.

Figure 4:
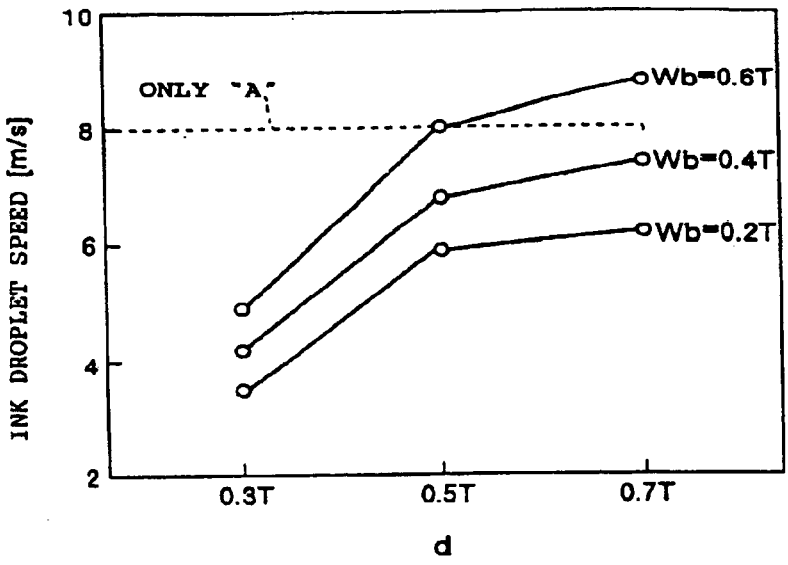
FIG. 4(a) is a diagram showing how the ink droplet speed changes upon application of various driving waveform signals and FIG. 4(b) is a diagram showing how the ink droplet volume changes upon application of various driving waveform signals.
Figure 4:
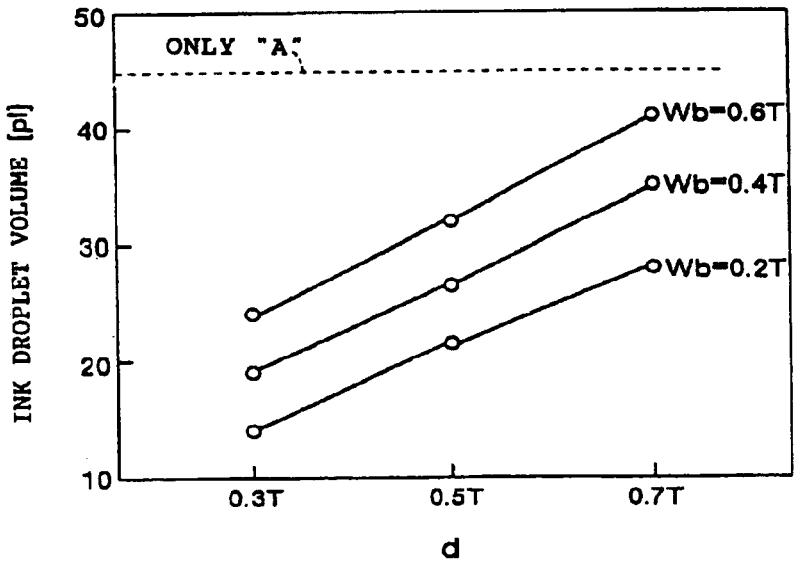

Reference is now made to the results of ink droplet ejection tests conducted in accordance with the driving method of this embodiment. FIGS. 4(a) and (b) are characteristic diagrams showing changes in ink droplet speed and one-dot link droplet volume in various combinations of the time difference, d, and the wave width, Wb, in connection with the driving waveform 10 shown in FIG. 1. In both figures, broken lines represent values of ink droplet speed (8 m/s) and ink droplet volume, 45 pl (picoliter), obtained by using only the jet pulse A for the ejection of ink. The values of ink droplet volume obtained by using both jet pulse signal A and additional pulse signal B are all smaller than the values when only the jet pulse signal A is used. Particularly, in any of the combinations 0.3T to 0.5T as time difference, d, and 0.2T to 0.67T as wave width, Wb, of the additional pulse signal B a considerably reduction in the size of ink droplet is attained. In comparison with the use of only the jet pulse signal A, the ink droplet speed decreases partially (at the time difference, d, of 0.3T), but in many of the other cases (0.5T to 0.7T in the time difference, d), the ink droplet speed does not decrease very much. By using the additional pulse signal B in such combination ranges of time difference and wave width as mentioned above, the ink droplet speed does not decrease very much, and a small ink droplet is obtained as compared with the use of only the jet pulse signal A.

Figure 5:
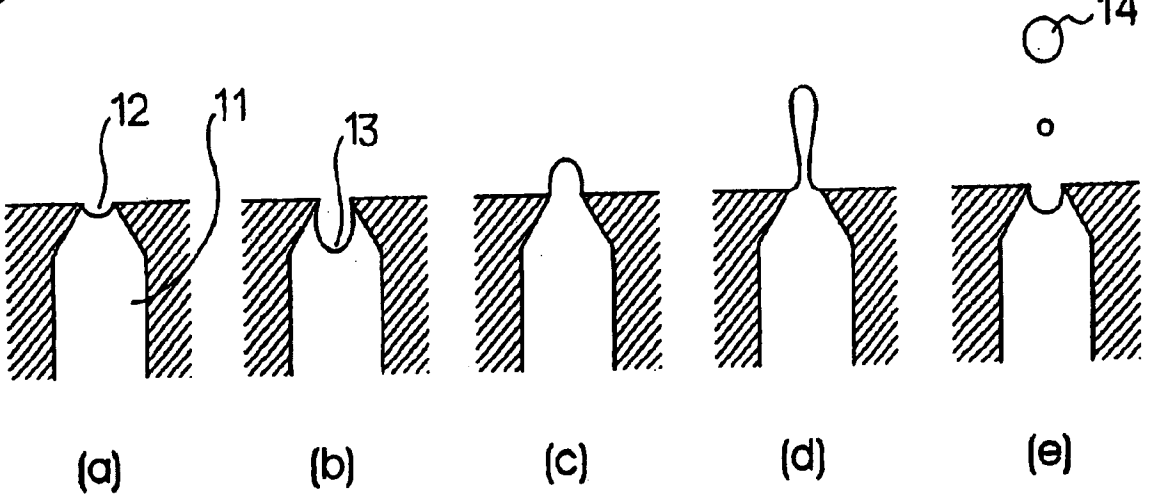
FIGS. 5(a)–5(e) are drawings showing how an ink droplet is ejected from a nozzle upon application of a conventional driving waveform signal.

FIGS. 5(a)–5(e) show the manner in which an ink droplet is ejected from a nozzle by applying only the jet pulse signal A to the actuator with respect to one dot, and FIGS. 6(a)–6(e) show the manner in which an ink droplet is ejected from the nozzle by using both jet pulse signal A and additional pulse signal B as in the embodiment of the invention shown in FIG. 1. In FIG. 5, at the leading edge of the jet pulse signal A, the volume of the ink chamber 11 increases and an ink meniscus 13 temporarily retracts inwardly of the nozzle 12 temporarily, as shown in FIG. 5(b). Then, at the trailing edge of the jet pulse signal A after the lapse of time required for one-way propagation of the pressure wave through the ink chamber 11, the volume of the ink chamber 11 decreases from the increased state to a normal state, whereby the ink is ejected from the nozzle while forming the ink droplet 14.

Figure 6:
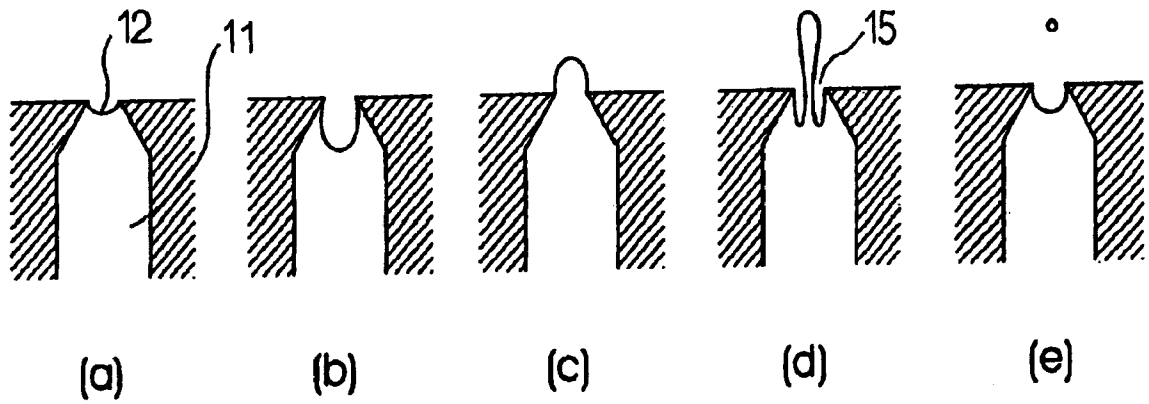
FIGS. 6(a)–6(e) are diagrams showing how an ink droplet is ejected from a nozzle upon application of a driving waveform signal according to the invention.

On the other hand, as shown in FIG. 6 according to this embodiment, the additional pulse signal B is applied after the fall of the jet pulse signal A, whereby a part of the ink droplet being ejected from the nozzle 12 is pulled back, resulting in a meniscus 15 as shown in FIG. 6(d), whereby an ink droplet 16 ejected from the nozzle 12 is made smaller in size than ink droplet 14. In this way, without changing the driving voltage and hence without increase of cost, the ejection of an ink droplet of a small volume can be attained by merely adding one pulse after the main driving waveform. Also, the ink droplet speed is only minimally decreased.

Figure 9:
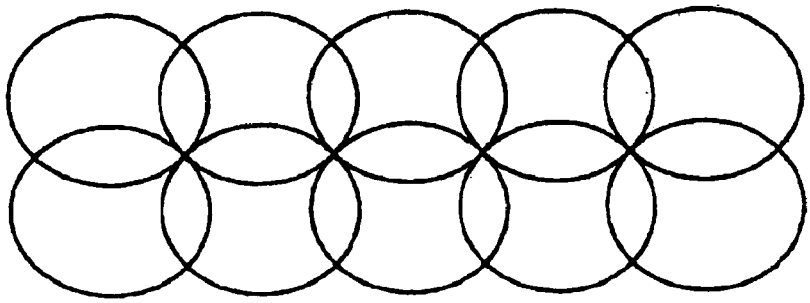
FIG. 9 is a diagram showing dots ejected at resolutions of 360 dpi, 720 dpi and 1440 dpi.
Figure 9:
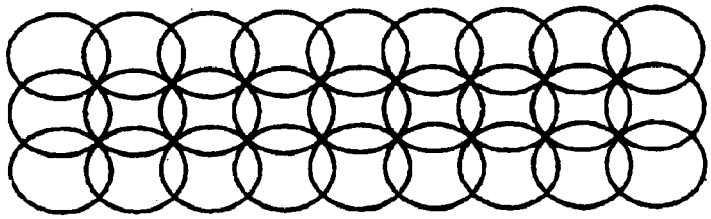
Figure 9:
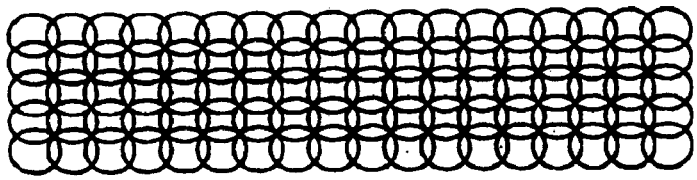

FIG. 9 shows printed states of continuous dot printings performed at resolution of 360 dpi, 720 dpi and 1440 dpi, respectively. As shown in FIG. 1 referred to previously, if the additional pulse signal B is annexed to the jet pulse signal A as a one-dot printing instruction and if, for example, the time difference, d, is set at 0.7T and the wave width, Wb, at 0.6T the ink droplet volume becomes 40 pl or so, which is suitable for printing at a resolution of 360 dpi. If the time difference, d, is set at 0.3T and the wave width, Wb, is set at 0.6T, the ink droplet volume becomes 25 pl or so, which is suitable for printing at a resolution of 720 dpi. Further, at a time difference, d, of 0.3T and a wave width, Wb, of 0.2T, the ink droplet volume is about 15 pl, which is suitable for printing at a resolution of 1440 dpi.

Although an embodiment of the invention has been described above, the invention is not limited therein. For example, although the main driving signal used in the above embodiment has only one jet pulse A, it may be a driving signal that includes two jet pulses. Also, regarding the ink droplet ejecting apparatus 600, no limitation is placed on the structure described in the above embodiment. Further, a similar apparatus can be used that is opposite in polarizing direction of the piezoelectric material.

Although in the above embodiment, air chambers 615 are formed on both sides of each ink chamber 613, ink chambers may be formed in a directly adjacent manner with no air chamber 615 therebetween. Further, although the actuator used in the above embodiment is a shear mode type, a structure may be used wherein layers of a piezoelectric material are laminated together and a pressure wave is generated by a deformation in the laminated direction. No limitation is imposed on the piezoelectric material. Further, any other material can be used insofar as a pressure wave is generated in each ink chamber.

What is claimed is:

1. An ink droplet ejecting method, wherein a jet pulse signal is applied to an actuator, for changing the volume of an ink chamber filled with ink, to generate a pressure wave within the ink chamber, thereby applying pressure to the ink and allowing a droplet of the ink to be ejected from a nozzle comprising the steps of:

applying said jet pulse signal to said actuator in accordance with a one-dot printing instruction, said jet pulse signal having a pulse width which allows the volume of said ink chamber to increase upon application of a leading edge of said jet pulse signal to said actuator, thereby causing a pressure wave to be generated within the ink chamber, and which, after the lapse of time T required for an approximately one-way propagation of the pressure wave through the ink chamber or after the lapse of an odd-multiple time of said time T, allows the volume of the ink chamber to decrease from the increased state to a normal state; and applying an additional pulse signal to said actuator in accordance with the one-dot printing instructions, said additional pulse signal having a pulse width of approximately 0.2T to 0.6T relative to said jet pulse signal and a time difference between a trailing edge of said jet pulse signal and a leading edge of said additional pulse signal being 0.3T to 0.7T.

2. The ink droplet ejecting method according to claim 1, wherein said jet pulse signal and said additional pulse signal have the same peak value.

3. The ink droplet ejecting method according to claim 1, wherein the step of applying an additional pulse signal includes applying an additional pulse signal with a controller that has a charging circuit, a discharge circuit, and a pulse control circuit.

4. The ink droplet ejecting method according to claim 3, wherein the step of applying an additional pulse signal with a controller includes applying an additional pulse signal with a pulse control circuit that has a CPU, a RAM, a ROM, an I/O Bus, a printing data receiving circuit, and pulse generators.

5. The ink droplet ejecting method according to claim 4, wherein the step of applying an additional pulse signal with a pulse control circuit includes applying an additional pulse signal with a ROM that has an ink droplet ejection control program storage area and a driving waveform data storage area.

6. An ink droplet ejecting apparatus for use with ink, comprising:

an ink chamber fillable with ink;

an actuator for changing the volume of said ink chamber;

a driving power source for applying an electric signal to said actuator; and a controller which provides control so that, in accordance with a one-dot printing instruction, a jet pulse signal and an additional pulse signal are applied to said actuator from said driving power source, thereby causing ink present in said ink chamber to be ejected, the controller providing control so that:

said jet pulse signal has a pulse width which allows the volume of said ink chamber to increase upon application of a leading edge of said jet pulse signal to said actuator, thereby causing a pressure wave to be generated within the ink chamber, and which, after the lapse of time T required for an approximately one-way propagation of the pressure wave through the ink chamber or after the lapse of an odd-multiple time of said time T, allows the volume of the ink chamber to decrease from the increased state to a normal state; and said additional pulse signal has a pulse width of approximately 0.2T to 0.6T relative to said jet pulse signal and a time difference between a trailing edge of said jet pulse signal and a leading edge of said additional pulse signal being 0.3T to 0.7T.

7. The ink droplet ejecting apparatus according to claim 6, wherein said jet pulse signal and said additional pulse signal have the same peak value.

8. The ink droplet ejecting apparatus according to claim 6, wherein the controller includes a charging circuit, a discharge circuit, and a pulse control circuit.

9. The ink droplet ejecting apparatus according to claim 8, wherein the pulse control circuit includes a CPU, a RAM, a ROM, an I/O Bus, a printing data receiving circuit, and pulse generators.

10. The ink droplet ejecting apparatus according to claim 9, wherein the ROM includes an ink droplet ejection control program storage area, and a driving waveform data storage areas.

11. An ink droplet ejecting apparatus for use with ink, comprising:

an ink chamber fillable with ink and defining a nozzle;

an actuator for changing the volume of said ink chamber;

a driving power source for applying an electric signal to said actuator; and a controller which controls the driving power source in accordance with a one-dot printing instruction to apply to the actuator a jet pulse signal and an additional pulse signal to eject a one-dot ink droplet from the nozzle, the controller determining whether said additional pulse signal is to be used based on volumes of the one-dot ink droplet ejected;

wherein the additional pulse signal is applied after a trailing edge of said jet pulse signal so as to allow the volume of said ink chamber to increase whereby a part of an ink droplet being ejected from the nozzle is pulled back.

12. The ink droplet apparatus according to claim 11, wherein the controller includes a charging circuit, a discharge circuit and a pulse control circuit.

13. The ink droplet ejecting apparatus according to claim 12, wherein the pulse control circuit includes a CPU, a RAM, a ROM, an I/O Bus, a printing data receiving circuit, and pulse generators.

14. The ink droplet ejecting apparatus according to claim 13, wherein the ROM includes an ink droplet ejection control program storage area, and a driving waveform data storage area.

15. The ink droplet ejecting apparatus of claim 11, wherein the volume of the one-dot ink droplet is varied in accordance with printing resolution set by a user.

16. The ink droplet ejecting apparatus according to claim 11, wherein said jet pulse signal and said additional pulse signal have the same peak value.

17. The ink droplet ejecting apparatus for use with ink, comprising:

an ink chamber fillable with ink and defining a nozzle;

an actuator for changing the volume of said ink chamber;

a driving power source for applying an electric signal to said actuator; and a controller which controls the driving power source in accordance with a one-dot printing instruction to apply to the actuator a jet pulse signal and an additional pulse signal to eject a one-dot ink droplet from the nozzle, the controller determining whether said additional pulse signal is to be used, the controller providing control so that a time difference from application of said jet pulse signal to applications of said additional pulse signal, and a pulse width of said additional pulse signal, are adjustable based on printing resolution set by the user.

18. The ink droplet ejecting apparatus according to claim 17, wherein:

said jet pulse signal has a pulse width which allows the volume of said ink chamber to increase upon application of a leading edge of said jet pulse signal to said actuator, thereby causing a pressure wave to be generated within the ink chamber, and which, after the lapse of time T required for an approximately one-way propagation of the pressure wave through the ink chamber or after the lapse of an odd-multiple time of said time T, allows the volume of the ink chamber to decrease from the increased state to a normal state; and a pulse width of said additional pulse signal is controlled so as to be adjustable in a range of approximately 0.2T to 0.6T relative to said just pulse signal, and said time difference is controlled so as to be adjustable in a range of approximately 0.3T to 0.7T from a trailing edge of said jet pulse signal to a leading edge of said additional pulse signal.

19. The ink droplet ejecting apparatus according to claim 17, wherein the controller includes a charging circuit, a discharge circuit, and a pulse control circuit.

20. The ink droplet ejecting apparatus according to claim 19, wherein the pulse control circuit includes a CPU, a RAM, a ROM, an I/O Bus, a printing data receiving circuit, and pulse generators.

21. The ink droplet ejecting apparatus according to claim 20, wherein the ROM includes an ink droplet ejection control program storage area, and a driving waveform data storage area.

22. The ink droplet ejecting apparatus of claim 17, wherein the time difference from application of said jet pulse signal to application of said additional pulse signal is becoming smaller as the printing resolution increases.

23. The ink droplet ejecting apparatus according to claim 17, wherein said jet pulse signal and said additional pulse signal have the same peak value.

24. The ink droplet ejecting apparatus according to claim 17, wherein the pulse width of the additional pulse becomes smaller as the printing resolution increases.

25. A storage medium, comprising:

a program for applying a jet pulse signal to an actuator in accordance with a one-dot printing instruction, the jet pulse signal having a pulse width which allows the volume of an ink chamber to increase upon application of a leading edge of said jet pulse signal to the actuator, thereby causing a pressure to be generated within the ink chamber, and which, after the lapse of time T required for an approximately one-way propagation of the pressure wave through the ink chamber or after the lapse of an odd-multiple time of said T, allows the volume of the ink chamber to decrease from the increased state to a normal state; and a program for applying an additional pulse signal to the actuator in accordance with the one-dot printing instruction, the additional pulse signal having a pulse width of approximately 0.2T to 0.6T relative to said jet pulse signal, and a time difference between a trailing edge of said jet pulse signal and a leading edge of said additional pulse signal being 0.3T to 0.7T.

*26. An ink droplet ejecting method, wherein a jet pulse signal is applied to an actuator, for changing the volume of an ink chamber filled with ink, to generate a pressure wave within the ink chamber, thereby applying pressure to the ink and allowing a droplet of the ink to be ejected from a nozzle, the jet pulse signal being followed by an additional pulse, comprising the steps of:*

*a step for decreasing the volume of the ink chamber by applying the jet pulse signal to the actuator, to apply pressure to the ink and allow a droplet of the ink to be ejected from the nozzle; and*

*a step for increasing the volume of the ink chamber by applying the additional pulse signal to the actuator to pull back a part of the droplet of the ink being ejected from the nozzle by the jet pulse signal, the additional pulse having a pulse width of approximately 0.2T to 0.6T, wherein T is a time required for an approximately one-way propagation of the pressure wave through the ink chamber.*

*27. The ink droplet ejecting method according to claim 26, wherein the jet pulse signal has a pulse width of T or an odd-multiple time of the time T, wherein T is a time required for an approximately one-way propagation of the pressure wave through the ink chamber.*

*28. The ink droplet ejecting method according to claim 26, wherein the jet pulse signal and the additional pulse signal have the same peak value.*

*29. An ink droplet ejecting method, wherein a jet pulse signal is applied to an actuator, for changing the volume of an ink chamber filled with ink, to generate a pressure wave within the ink chamber, thereby applying pressure to the ink and allowing a droplet of the ink to be ejected from a nozzle, the jet pulse signal being followed by an additional pulse, comprising the steps of:*

*a step for decreasing the volume of the ink chamber by applying the jet pulse signal to the actuator, to apply pressure to the ink and allow a droplet of the ink to be ejected from the nozzle; and*

*a step for increasing the volume of the ink chamber by applying the additional pulse signal to the actuator to pull back a part of the droplet of the ink being ejected from the nozzle by the jet pulse signal, wherein a time difference between a trailing edge of the jet pulse and a leading edge of the additional pulse is 0.3T to 0.7T, wherein T is a time required for an approximately one-way propagation of the pressure wave through the ink chamber.*

*30. The ink droplet ejecting method according to claim 29, wherein the jet pulse signal has a pulse width of T or an odd-multiple time of time T, wherein T is a time required for an approximately one-way propagation of the pressure wave through the ink chamber.*

*31. The ink droplet ejecting method according to claim 29, wherein the jet pulse signal and the additional pulse signal have the same peak value.*

*32. An ink droplet ejecting method, wherein a jet pulse signal is applied to an actuator, for changing the volume of an ink chamber filled with ink, to generate a pressure wave within the ink chamber, thereby applying pressure to the ink and allowing a droplet of the ink to be ejected from a nozzle, the jet pulse signal being followed by an additional pulse, comprising the steps of:*

*a step for decreasing the volume of the ink chamber by applying the jet pulse signal to the actuator, to apply pressure to the ink and allow a droplet of the ink to be ejected from the nozzle; and*

*a step for increasing the volume of the ink chamber by applying the additional pulse signal to the actuator to pull back a part of the droplet of the ink being ejected from the nozzle by the jet pulse signal, the additional pulse having a pulse width of approximately 0.2T to 0.6T, wherein a time difference between a training edge of the jet pulse and a leading edge of the additional pulse is* 0.3T to 0.7T, wherein T is a time required for an approximately one-*way propagation of the pressure wave through the ink chamber.*

*33. An ink droplet ejecting method, wherein an applied voltage to an actuator is changed, for increasing and decreasing the volume of an ink chamber filled with ink, to generate a pressure wave within the ink chamber, thereby applying pressure to the ink, comprising the steps of:*

*a first step for ejecting a droplet of the ink from a nozzle by decreasing the volume of the ink chamber; and*

*a second step for pulling back a part of the droplet of the ink being ejected from the nozzle by the first step, by increasing the volume of the ink chamber and maintaining the volume of the ink chamber constant, wherein a period of the second step is approximately 0.2T to 0.6T, wherein T is a time required for an approximately one-way propagation of the pressure wave through the ink chamber.*

*34. The ink droplet ejecting method according to claim 33, further comprising a preparatory step, followed by the first step, for preparing the ejection of the droplet of the ink by increasing the volume of the ink chamber and maintaining constant the volume of the ink chamber, wherein a total period of the preparatory step and the first step is T or an odd-multiple time of the time T, wherein T is a time required for an approximately one-way propagation of the pressure wave through the ink chamber.*

*35. The ink droplet ejecting method according to claim 34, wherein the preparatory step and the first step comprise*

*applying a first pulse signal to the actuator and the second step comprises applying a second pulse signal to the actuator.*

*36. The ink droplet ejecting method according to claim 35, wherein the first pulse signal and the second pulse signal have the same peak value.*

*37. An ink droplet ejecting method, wherein an applied voltage to an actuator is changed, for increasing and decreasing the volume of an ink chamber filled with ink, to generate a pressure wave within the ink chamber, thereby applying pressure to the ink, comprising the steps of:*

*a first step for ejecting a droplet of the ink from a nozzle by decreasing the volume of the ink chamber; and*

*a second step for pulling back a part of the droplet of the ink being ejected from the nozzle by the first step, by increasing the volume of the ink chamber and maintaining constant the volume of the ink chamber, wherein a time difference between the end of the first step and the start of the second step is 0.3T to 0.7T, wherein T is a time required for an approximately one-way propagation of the pressure wave through the ink chamber.*

*38. The ink droplet ejecting method according to claim 37, further comprising a preparatory step, followed by the first step, for preparing the ejection of the droplet of the ink by increasing the volume of the ink chamber and maintaining constant the volume of the ink chamber, wherein a total period of the preparatory step and the first step is T or an odd-multiple time of the time T, wherein T is a time required for an approximately one-way propagation of the pressure wave through the ink chamber.*

*39. The ink droplet ejecting method according to claim 38, wherein the preparatory step and the first step comprise applying a first pulse signal to the actuator and the second step comprises applying a second pulse signal to the actuator.*

*40. The ink droplet ejecting method according to claim 39, wherein the first pulse signal and the second pulse signal have the same peak value.*

*41. An ink droplet ejecting method, wherein an applied voltage to an actuator is changed, for increasing and decreasing the volume of an ink chamber filled with ink, to generate a pressure wave within the ink chamber, thereby applying pressure to the ink, comprising the steps of:*

*a first step for ejecting a droplet of the ink from a nozzle by decreasing the volume of the ink chamber; and*

*a second step for pulling back a part of the droplet of the ink being ejected from the nozzle by the first step, by increasing the volume of the ink chamber and maintaining constant the volume of the ink chamber, wherein a period of the second step is approximately 0.2T and 0.6T and a time difference between the end of the first step and the start of the second step is 0.3T to 0.7T, wherein T is a time required for an approximately one-way propagation of the pressure wave through the ink chamber.*

* * * * *